US012599536B2

(12) United States Patent
Liu

(10) Patent No.: US 12,599,536 B2
(45) Date of Patent: *Apr. 14, 2026

(54) ADULT TOY

(71) Applicant: HYTTO PTE. LTD., Singapore (SG)

(72) Inventor: Dan Liu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 932 days.

This patent is subject to a terminal disclaimer.

(21) Appl. No.: 17/850,907

(22) Filed: Jun. 27, 2022

(65) Prior Publication Data

US 2023/0044372 A1 Feb. 9, 2023

Related U.S. Application Data

(63) Continuation-in-part of application No. 16/673,988, filed on Nov. 5, 2019, now Pat. No. 11,406,560.

(51) Int. Cl.
*A61H 19/00* (2006.01)
*A61H 9/00* (2006.01)

(52) U.S. Cl.
CPC ........... *A61H 19/32* (2013.01); *A61H 9/0007* (2013.01); *A61H 9/0078* (2013.01); *A61H 2201/169* (2013.01)

(58) Field of Classification Search
CPC .... A61H 19/32; A61H 9/0007; A61H 9/0078; A61H 2201/169; A61H 9/0092; A61H 2201/0153; A61H 2201/0157; A61H 2201/1238; A61H 2201/5025; A61H 2201/5056; A61H 2201/5071; A61H 23/00
USPC ........................................................... 600/38
See application file for complete search history.

(56) References Cited

U.S. PATENT DOCUMENTS

| | | | | |
|---|---|---|---|---|
| 9,050,240 B2 | 6/2015 | Howsam | | |
| 10,427,866 B2 | 10/2019 | Russett, III | | |
| 10,945,914 B1 | 3/2021 | Liu | | |
| 2005/0222625 A1* | 10/2005 | Laniado | A61N 2/02 | 607/2 |
| 2006/0206174 A1* | 9/2006 | Honeycutt | A61N 2/02 | 600/27 |

(Continued)

FOREIGN PATENT DOCUMENTS

| | | | |
|---|---|---|---|
| CN | 101868280 A * | 10/2010 | A61N 1/36114 |
| EP | 1078649 A1 * | 2/2001 | A61N 1/3625 |

(Continued)

*Primary Examiner* — Brian L Casler
(74) *Attorney, Agent, or Firm* — Holtz, Holtz & Volek PC

(57) ABSTRACT

An adult toy includes a substantially hollow cylindrical body and a vagina-shaped element arranged inside the substantially hollow cylindrical body. The vagina-shaped element includes an opening at a first end of the substantially hollow cylindrical body to receive a male genital organ therein. The adult toy includes a chamber arranged between the substantially hollow cylindrical body and the vagina-shaped element, with the chamber surrounding the vagina-shaped element, and further includes an air pump arranged towards a second end of the substantially hollow cylindrical body. The air pump is disposed in fluid communication with an ambient atmosphere and the chamber and provides an air pressure inside the chamber. The chamber inflates and deflates based on the air pressure therein to cause the vagina-shaped element to compress and decompress to stimulate the male genital organ received therein.

12 Claims, 9 Drawing Sheets

(56) References Cited

U.S. PATENT DOCUMENTS

| | | | | |
|---|---|---|---|---|
| 2016/0271408 | A1* | 9/2016 | Newton | A61N 1/3904 |
| 2017/0087049 | A1 | 3/2017 | Hutchison | |
| 2017/0340265 | A1 | 11/2017 | Shen | |
| 2018/0242875 | A1* | 8/2018 | Volpe | A61B 5/0006 |
| 2022/0200854 | A1* | 6/2022 | Kane | H04L 41/0816 |

FOREIGN PATENT DOCUMENTS

| | | | | | |
|---|---|---|---|---|---|
| ID | P202500635 | A | * | 1/2025 | |
| JP | 7683871 | B2 | * | 5/2025 | A61B 5/0535 |
| WO | WO-2012048302 | A2 | * | 4/2012 | A61B 5/4848 |
| WO | WO-2014207407 | A1 | * | 12/2014 | A61B 5/4836 |
| WO | WO-2023079422 | A1 | * | 5/2023 | A61B 5/358 |

* cited by examiner

ADULT TOY

TECHNICAL FIELD

The present disclosure generally relates to adult toys, also known as sex toys, and particularly relates to an adult toy to be implemented for providing stimulation to male genitalia.

BACKGROUND

An adult toy (or sex toy) is an object or device that is primarily used to facilitate human sexual pleasure and is typically designed to resemble human genitals. The growing acceptance of sexuality and masturbation resulted in the growth of a market for adult toys. For example, male masturbation is often done using an adult toy that causes friction to help reaching the excitement. Adult toys of the kind of male masturbators have been known for a long time. In particular, these types of adult toys have a shape or form fitted with an orifice where the penis is introduced and that have a design that stimulates different sexual techniques. Also known are adult toys that are able to recreate an effect similar to the intercourse, by reproducing the effect of penis penetration movement. This effect is generally recreated by the elastic elements located on the open extremity of the male masturbators.

One of the most common types of male masturbators consists of a rigid cylindrical container in which the male sexual organ is inserted. The said rigid container is hollow and equipped with pneumatic systems changing the internal pressure and therefore increasing the pressure on the male organ and ensuring pleasure. However, it has been observed that the known adult toys generally fail to accurately simulate actual intercourse. In particular, the existing devices with the elastic elements are not able to provide consistent pressure on all regions of the male genitalia inserted inside thereof, since the air pressure source or the pneumatic systems typically exert pressure only on single or a few points/regions, thus leaving the user unsatisfied.

Therefore, it is desirable to provide an adult toy that can accurately simulate sexual intercourse in order to satisfy male sexual urge.

SUMMARY OF THE EMBODIMENTS

Various aspects and embodiments of the present disclosure provide an adult toy which can recreate on the male genital organ an effect similar to the sexual intercourse.

In an embodiment, an adult toy is disclosed. The adult toy includes a substantially hollow cylindrical body having a first end and a second end. The adult toy also includes a vagina-shaped element arranged inside the cylindrical body. The vagina-shaped element provides an opening at the first end of the cylindrical body to receive a male genital organ inside thereof. The adult toy includes a chamber arranged between the substantially hollow cylindrical body and the vagina-shaped element, surrounding the vagina-shaped element. Further, an air pump is arranged towards the second end of the substantially hollow cylindrical body. The air pump is disposed in fluid communication with an ambient atmosphere and the chamber and configured to provide an air pressure inside the chamber. The chamber is adapted to inflate and deflate based on the air pressure inside thereof to cause the vagina-shaped element to compress and decompress to stimulate the male genital organ received inside thereof.

In another embodiment, an adult toy for providing stimuli to a male genital organ is disclosed. The adult toy includes a substantially hollow cylindrical body having a first end and a second end and a vagina-shaped element arranged inside the substantially hollow cylindrical body. The vagina-shaped element includes an opening at the first end of the substantially hollow cylindrical body to receive the male genital organ inside thereof. Further, the adult toy includes a chamber arranged between the substantially hollow cylindrical body and the vagina-shaped element, surrounding the vagina-shaped element. The adult toy further includes an air pump arranged towards the second end of the substantially hollow cylindrical body. The air pump is disposed in fluid communication with an ambient atmosphere and the chamber and configured to provide an air pressure inside the chamber. The adult toy includes a controller configured to control the opening and closing of the first valve for regulating the air pressure inside the chamber. The chamber is adapted to inflate and deflate based on the air pressure inside thereof to cause the vagina-shaped element to compress and decompress to stimulate the male genital organ received inside thereof.

Other aspects and example embodiments are provided in the drawings and the detailed description that follows.

BRIEF DESCRIPTION OF DRAWINGS

For a more complete understanding of example embodiments of the present technology, reference is now made to the following descriptions taken in connection with the accompanying drawings in which.

The drawings referred to in this description are only exemplary in nature and shall not be construed as limiting the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure can be practiced with details other than these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Figure 1:
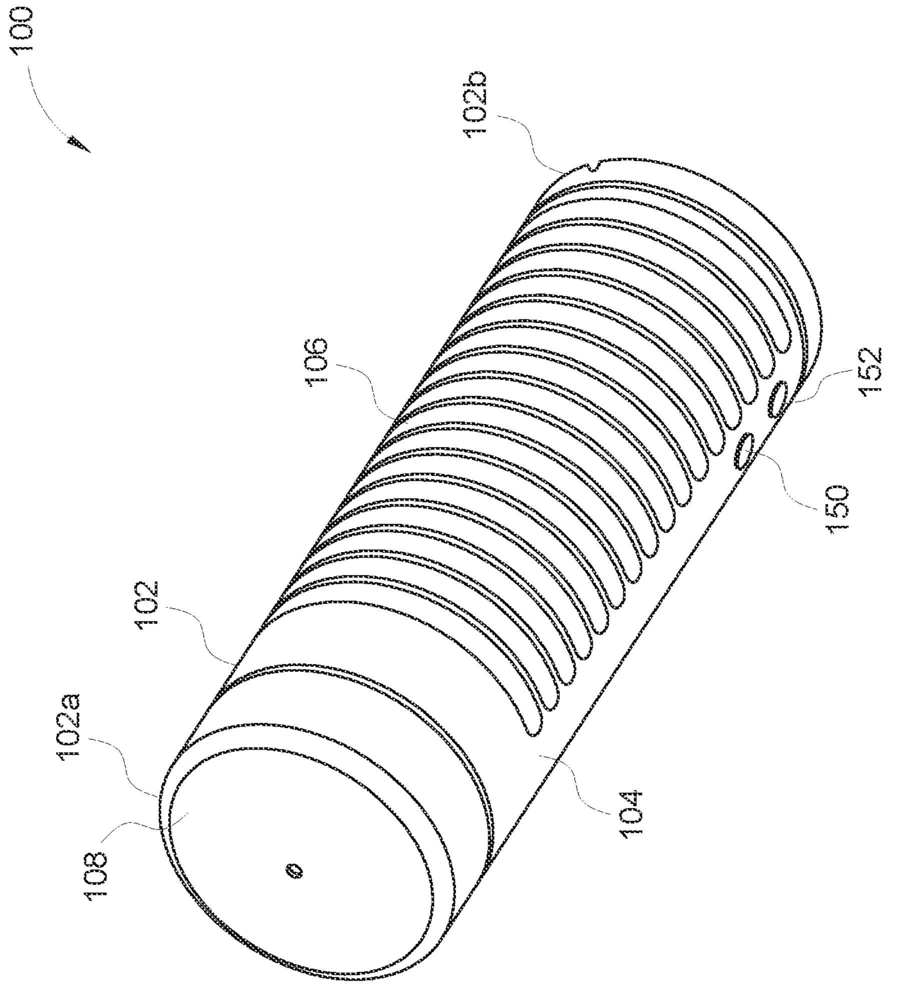
FIG. 1 illustrates a diagrammatic perspective view of an adult toy, in accordance with one or more embodiments of the present disclosure.

Referring to FIG. 1, illustrated is diagrammatic view of an adult toy (generally referred by the numeral 100), in accordance with one or more embodiments of the present disclosure. As illustrated in FIG. 1, the adult toy 100 includes a cylindrical body 102 shaped to resemble the look and feel of an erect penis. In the present embodiments, the cylindrical body 102 is a substantially hollow structure. The cylindrical body 102 is sized and shaped to allow a flaccid, partially erect, or fully erect penis to be inserted therein. The cylindrical body 102 has a first end 102*a* and a second end 102*b*. The cylindrical body 102 includes an outer surface 104. As shown in FIG. 1, the adult toy 100 includes ribs 106 formed on the outer surface 104 of the cylindrical body 102. The ribs 106 help to provide better grip when the cylindrical body 102 of the adult toy 100 is being held by the user. The cylindrical body 102 can be made of any rigid or semi-rigid yet soft material such as rubber, silicone, or the like. Further, as illustrated, the adult toy 100 includes a cap 108 adapted to be removably coupled with the cylindrical body 102 at the first end 102*a* thereof. In the present examples, the cap 108 may be screwed or clamped to the first end 102*a* of the cylindrical body 102.

Figure 2:
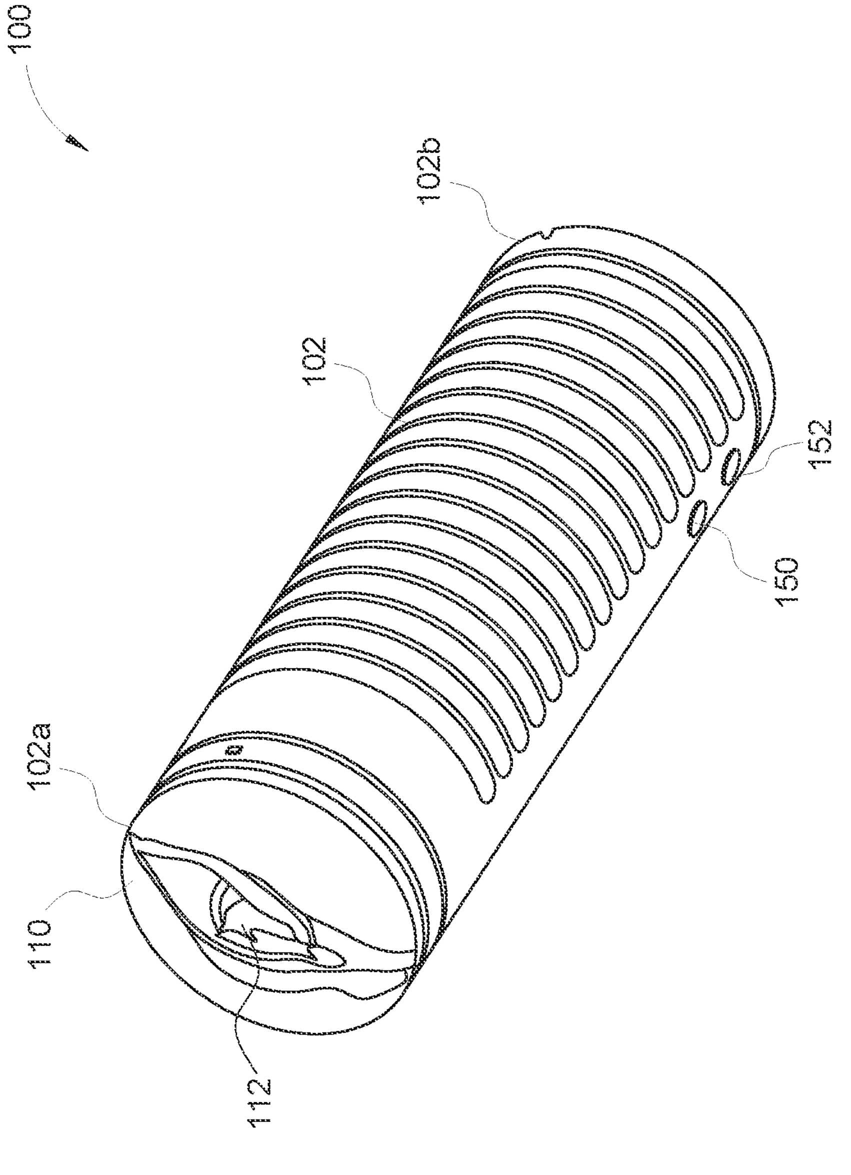
FIG. 2 illustrates a diagrammatic perspective view of the adult toy showing a first end of a cylindrical body with a cap removed therefrom, in accordance with one or more embodiments of the present disclosure.
Figure 3:
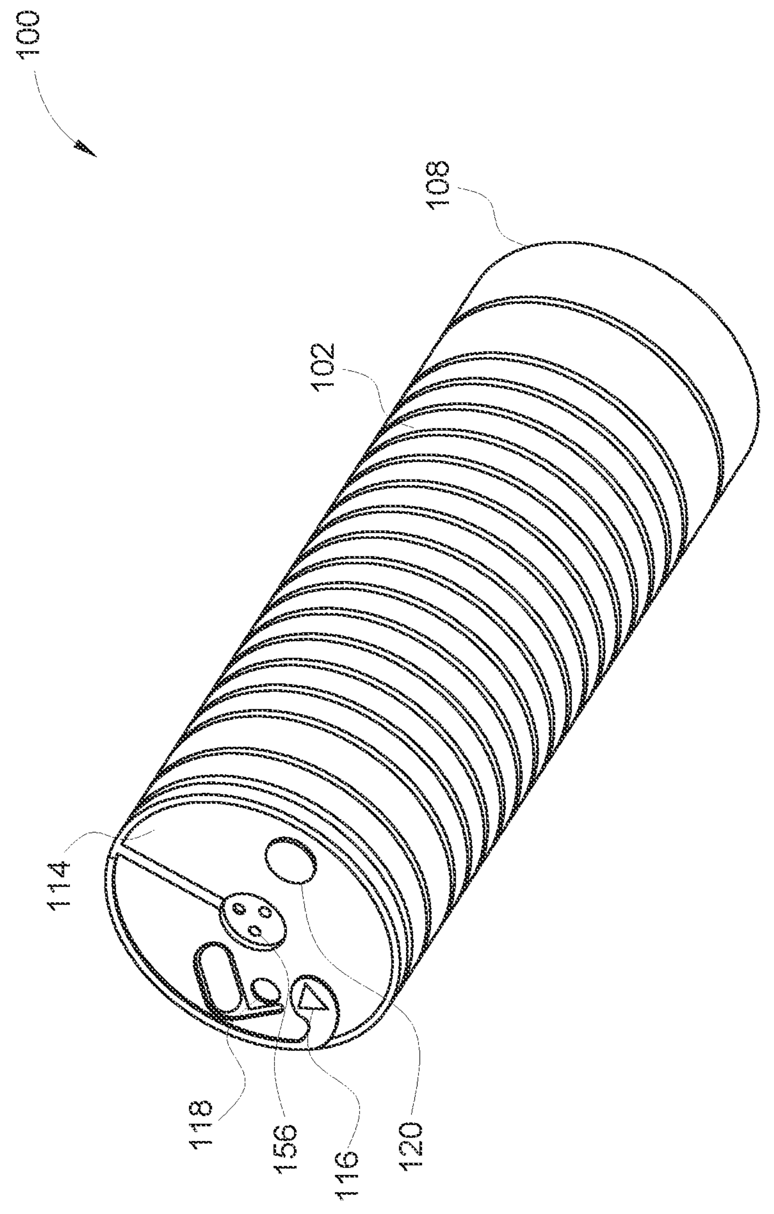
FIG. 3 illustrates a diagrammatic perspective view of the adult toy showing a second end of the cylindrical body with a cover plate arranged thereon, in accordance with one or more embodiments of the present disclosure.

Referring now to FIGS. 2 and 3, illustrated are the views of the adult toy 100 from the two ends, the first end 102*a* and the second end 102*b*, respectively. As shown in FIG. 2, the adult toy 100 includes a vagina-shaped element 110 arranged inside the cylindrical body 102 (better illustrated in FIGS. 4-5). The vagina-shaped element 110 provides an opening 112 at the first end 102*a* of the cylindrical body 102. The opening 112 is designed and shaped to receive a male genital organ through thereof, to be accommodated inside the vagina-shaped element 110. In the present examples, the vagina-shaped element 110 is made of soft glue like materials. For example, the vagina-shaped element 110 is made of one or more thermoplastic elastomers (TPR). Further, the opening 112 is of labyrinth form. In some examples, the opening 112 includes a mesh, a gauze or a sponge. As discussed, the cap 108 couples with the cylindrical body 102 at the first end 102*a*, thereby covering the opening 112 of the vagina-shaped element 110.

Also, as shown in FIG. 3, the adult toy 100 includes a cover plate 114 arranged at the second end 102*b* of the cylindrical body 102. The cover plate 114 is generally shaped like a flat circular plate fixedly coupled to the second end 102*b* of the cylindrical body 102. As may be seen, the cover plate 114 is provided with a first air-hole 116, a second air-hole 118 and a third air-hole 120. The air-holes 116, 118 and 120 are apertures in the cover plate 114 to allow for fluid communication between inside of the cylindrical body 102 and the ambient atmosphere. In some examples, one or more of the air-holes 116, 118 and 120 may be a group of apertures without departing from the scope of the present disclosure.

Figure 4:
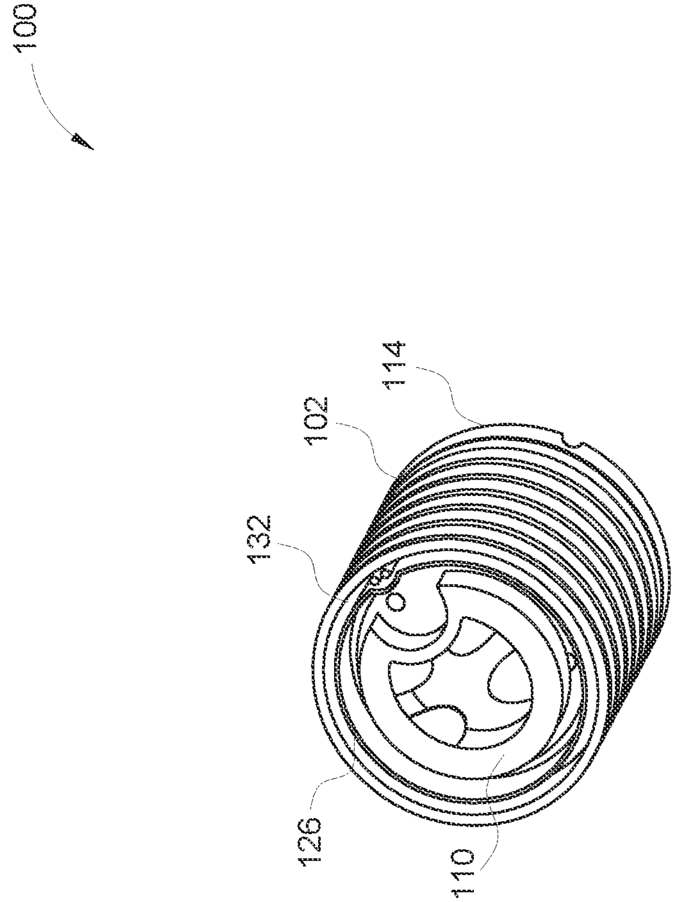
FIG. 4 illustrates a diagrammatic sectional perspective view of the adult toy sectioned along a lateral plane, in accordance with one or more embodiments of the present disclosure.
Figure 5:
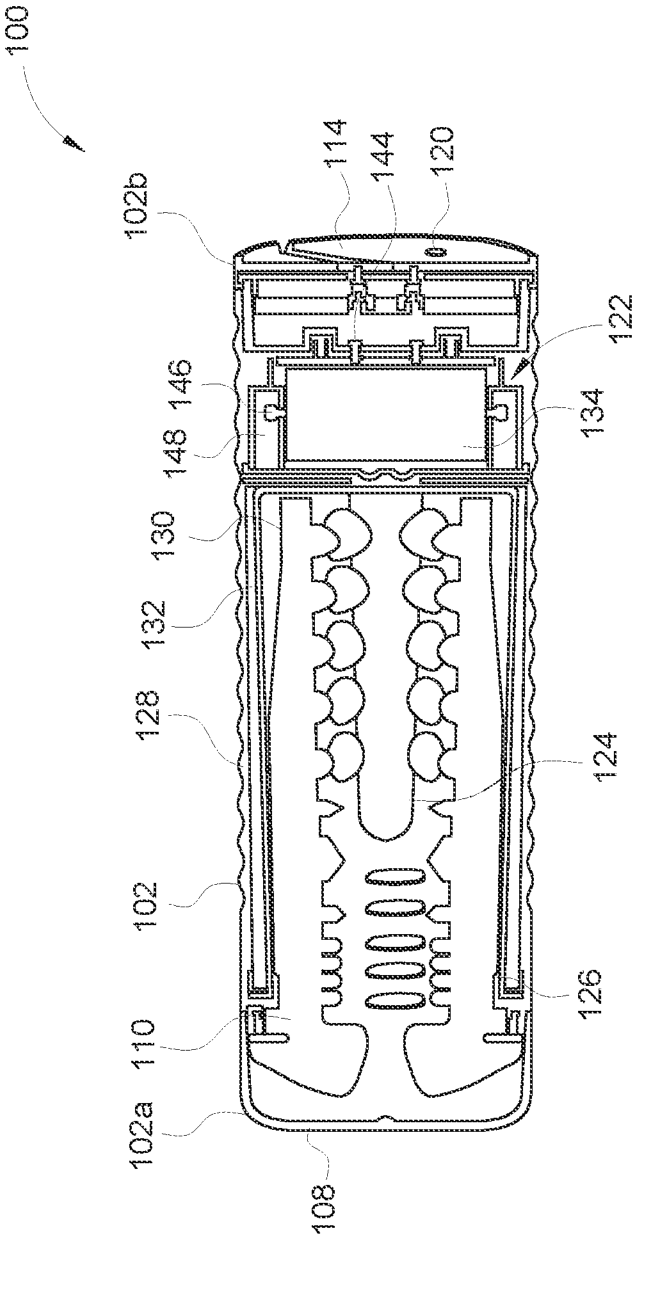
FIG. 5 illustrates a diagrammatic sectional view of the adult toy sectioned along a longitudinal plane, in accordance with one or more embodiments of the present disclosure.
Figure 6:
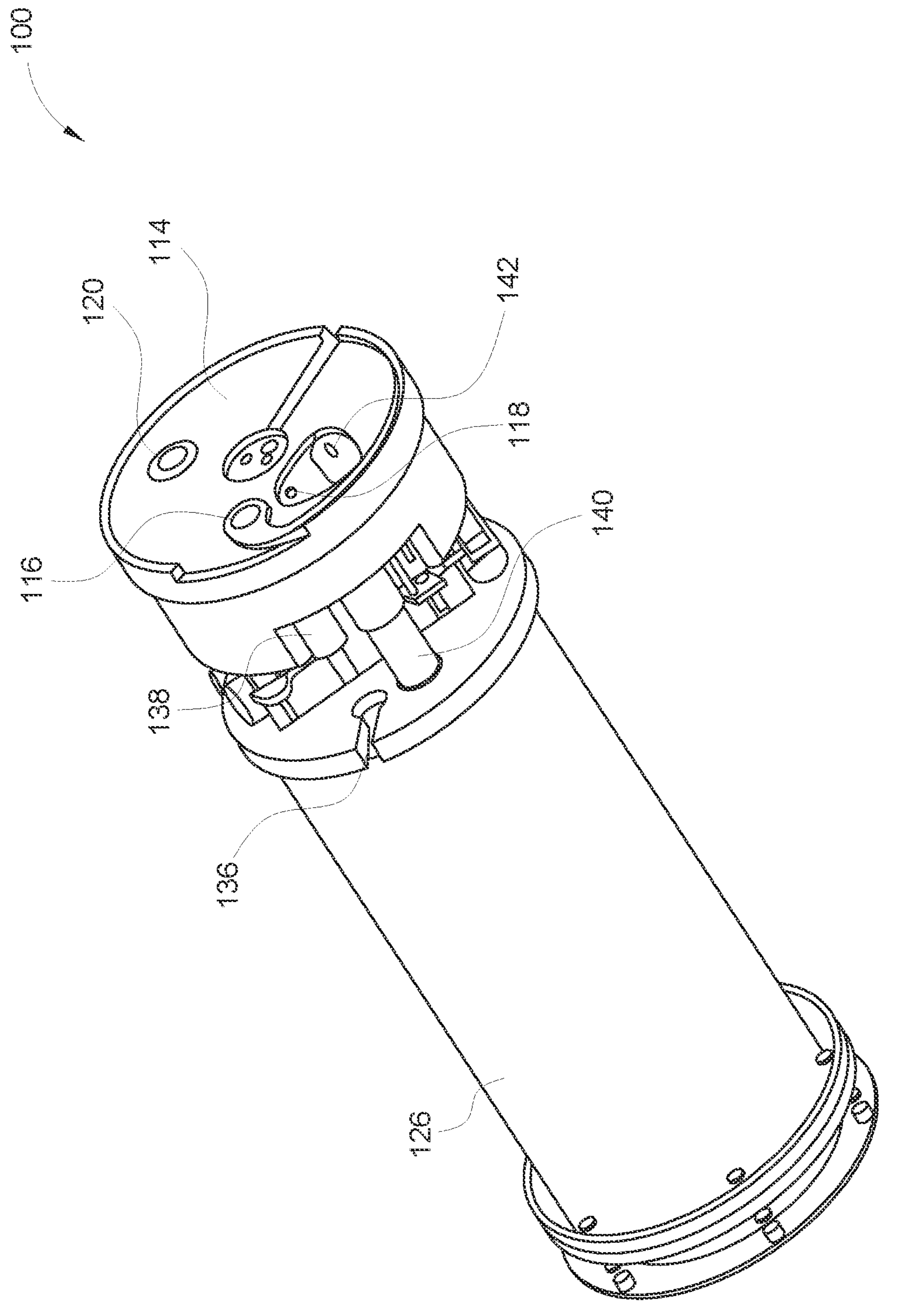
FIG. 6 illustrates a diagrammatic perspective view of the adult toy with the cylindrical body and the cap removed therefrom, in accordance with one or more embodiments of the present disclosure.
Figure 7:
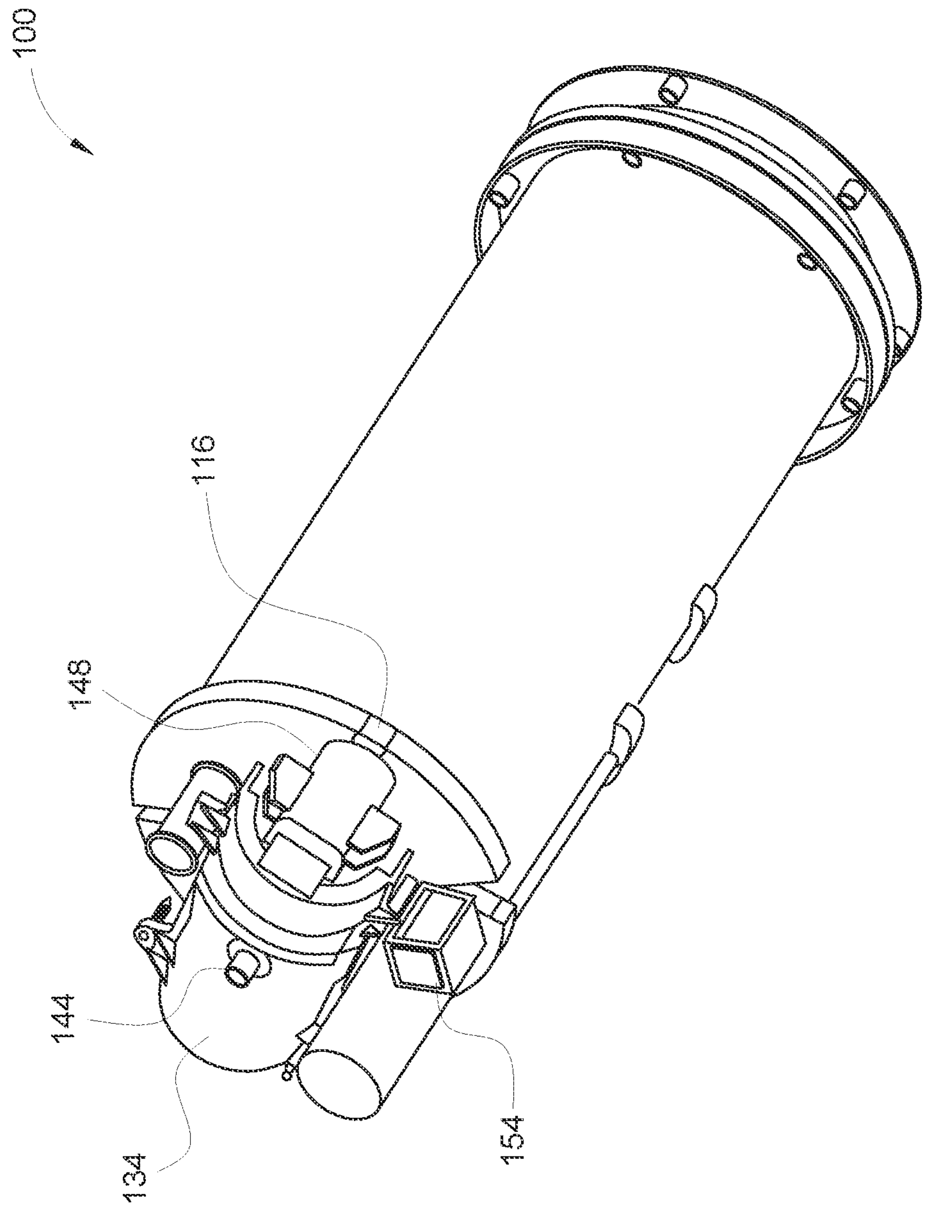
FIGS. 7-8 illustrate diagrammatic perspective views of the adult toy with the cylindrical body, the cove plate and the cap removed therefrom, in accordance with one or more embodiments of the present disclosure.
Figure 8:
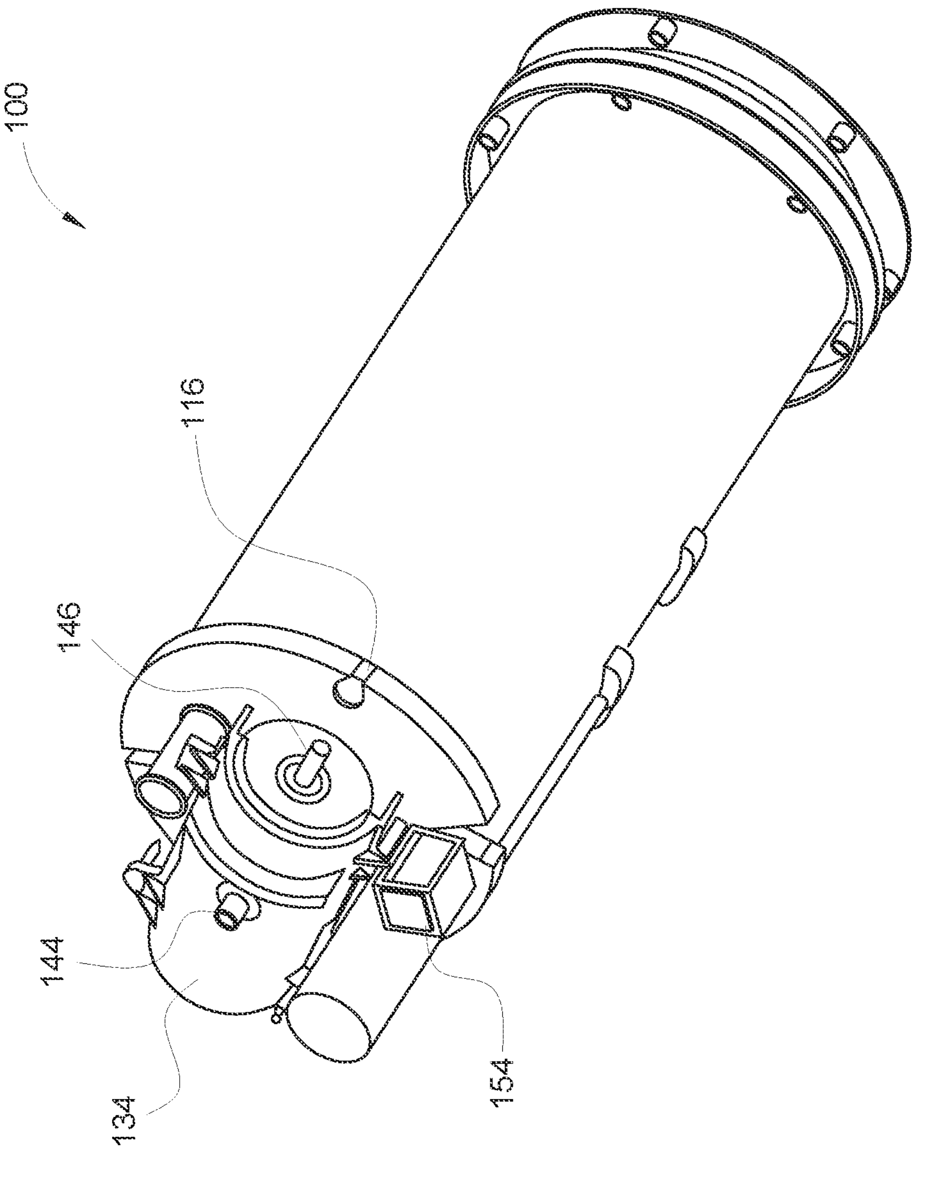
Figure 9:
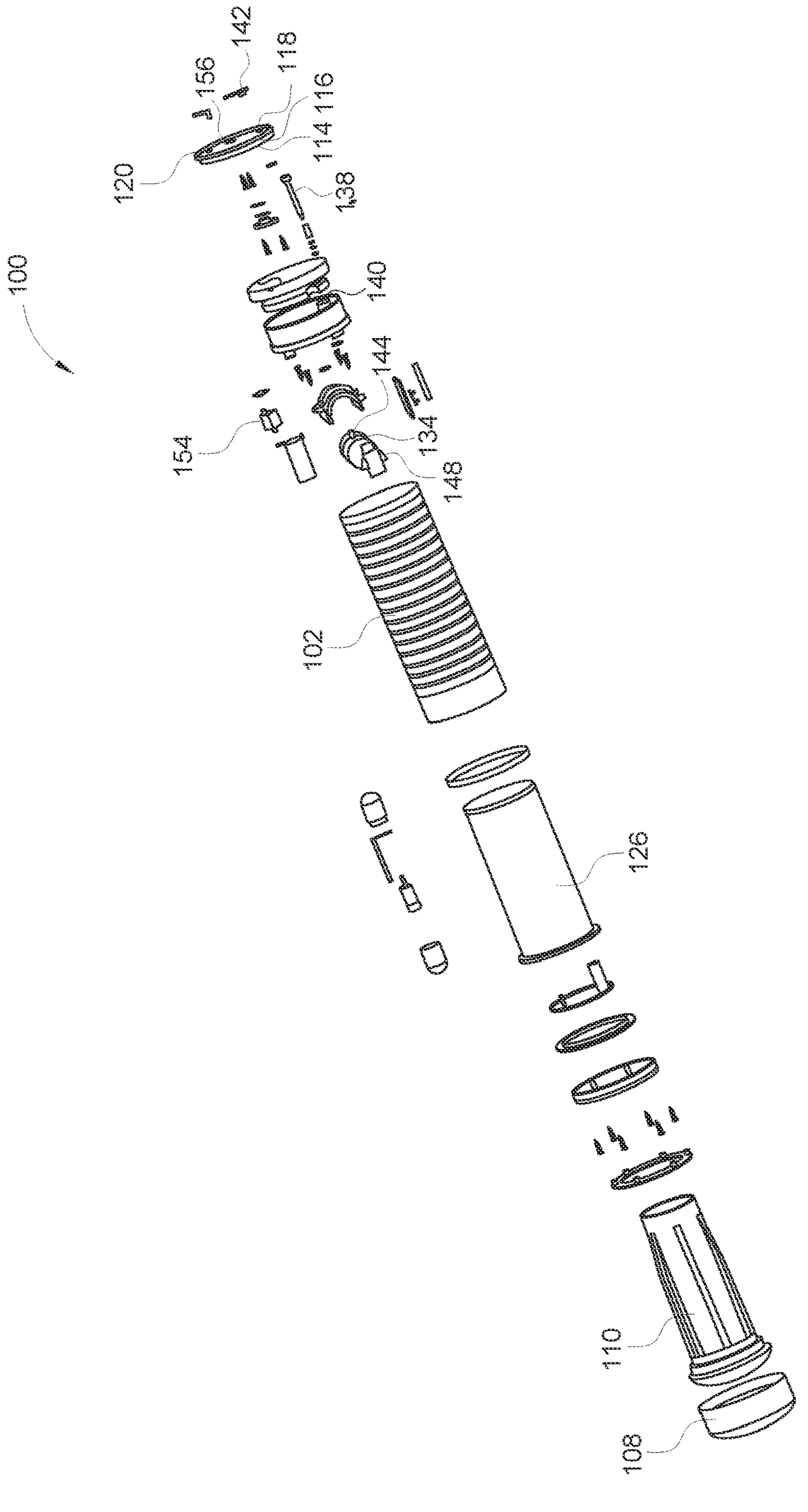
FIG. 9 illustrates a diagrammatic exploded view of the adult toy, in accordance with one or more embodiments of the present disclosure.

FIGS. 4-5 illustrate diagrammatic sectional perspective views of the adult toy 100. Referring now to FIGS. 4-5 in combination, as illustrated, the vagina-shaped element 110 is arranged co-axially inside the cylindrical body 102. The vagina-shaped element 110 may extend partially along the length of the cylindrical body 102 between the first end 102*a* and the second end 102*b* thereof. Specifically, the vagina-shaped element 110 may extend from proximal to the first end 102*a* towards the second end 102*b*, substantially more than mid-way of the length of the cylindrical body 102; and thereby, the vagina-shaped element 110 may define an empty space or compartment 122 towards the second end 102*b*, inside the cylindrical body 102. Further, as may be seen, particularly in FIG. 5, the vagina-shaped element 110 may have channels built into the structure to use gel or metal foil or other electrically or thermally conductive materials to direct sensations or stimuli to specific regions on the surface of the male genital organ received inside thereof. The vagina-shaped element 110 includes walls for example, an inner wall 124 and an outer wall 130. The inner wall 124 of the vagina-shaped element 110 includes a flexible, stretching mesh or fabric like a sock configured to hold a flaccid penis (male genital organ). The mesh is configured to expand or stretch as the penis may become fully erect during use of the adult toy 100.

As illustrated, the adult toy 100 includes a flexible bag 126 arranged between the cylindrical body 102 and the vagina-shaped element 110. In particular, the flexible bag 126 is arranged between an inner surface 128 of the cylindrical body 102 and the outer wall 130 of the vagina-shaped element 110. As shown, the flexible bag 126 surrounds the vagina-shaped element 110, such that a chamber 132 is defined between the inner surface 128 of the cylindrical body 102 and the flexible bag 126. As may be seen, the chamber 132 is generally in the shape of a hollow cylinder, co-axially disposed inside the cylindrical body 102, and provides empty space therein. For this purpose, in the present examples, the flexible bag 126 is in the shape of a cylindrical sleeve. Further, it may be appreciated that the flexible bag 126 may itself act as a chamber inside the cylindrical body 102. In the present examples, the flexible bag 126 may be any suitable bag made of elastic material and able to withstand air pressures needed for inflation of the flexible bag 126 to required extent for compression of the vagina-shaped element 110, as discussed later in more detail.

Further, as illustrated, the adult toy 100 includes an air pump 134 arranged inside and placed generally towards the second end 102*b* of the cylindrical body 102. As may be seen, the air pump 134 is disposed in the compartment 122 of the cylindrical body 102. The air pump 134 is disposed in fluid communication with the ambient atmosphere and the chamber 132. In particular, the third air-hole 120, in the cover plate 114, is adapted to be disposed in fluid communication with the air pump 134, to allow the air pump 134 to draw air from the ambient atmosphere. For the purposes of the present disclosure, the air pump 134 is a vacuum pump as known in the art. The air pump 134 is configured to pressurize the drawn air and provide air pressure inside the chamber 132. In a similar manner, in the adult toy 100, the first air-hole 116 is adapted to be disposed in fluid communication with the chamber 132 to vent out pressurized air therefrom and the second air-hole 118 is adapted to be disposed in fluid communication with the flexible bag 126 to vent out pressurized air therefrom.

Referring now to FIGS. 6-9 (and further referring back to FIG. 5) in combination, in particular, as shown, the adult toy 100 includes a first valve 136 provided on the chamber 132. The first valve 136 is arranged on an air-outlet (not shown) of the chamber 132. In one example, the first valve 136 includes a flap, such that the first valve 136 is disposed in an open position to allow for venting out pressurized air from the chamber 132 when pushed (i.e. when the flap is pushed to be pivoted at an angle with respect to the air-outlet of the chamber 132). Further, the adult toy 100 includes a first outlet pipe 138 aligned with the first valve 136 and arranged with respect to the first air-hole 116 to translate (i.e. move) inside thereof. This way the first outlet pipe 138 can be pushed to move downwards with respect to the first air-hole 116 to move through the first air-hole 116 to in-turn push the first valve 136, and thus venting out pressurized air from the chamber 132, when required.

Further, as illustrated, the adult toy 100 includes a second outlet pipe 140 connecting the flexible bag 126 to the second air-hole 118. The adult toy 100 further includes a second valve 142 arranged with respect to the second air-hole 118. In one example, the second valve 142 includes a rotating shutter arranged on the cover plate 114. Alternatively, the second valve 142 may be arranged on an air-outlet (not shown) of the flexible bag 126. The second valve 142 is adapted to be moved between an open position and a closed position, by rotating a cover sheet thereof, to uncover and cover the second air-hole 118 respectively. It may be appreciated that in the open position, the second valve 142 allows to vent out pressurized air from the second air-hole 118, when required.

Furthermore, as illustrated, the adult toy 100 includes an air intake pipe 144 disposing the air pump 134 in fluid communication with the ambient atmosphere. It may be appreciated that the air intake pipe 144 may be in the form of protrusion, extending up to the cover plate 114. Also, the adult toy 100 includes an air outtake pipe 146 connecting and disposing the air pump 134 in fluid communication with the chamber 132. In some examples, as illustrated, the adult toy 100 may further include an extended air outtake pipe 148 connecting the air outtake pipe 146 (extending from the air pump 134) to the chamber 132.

In operation, the adult toy 100 of the present disclosure allows a user to insert his penis inside the opening 112 in the vagina-shaped element 110 (by first removing the cap 108 therefrom). As the penis is received inside the vagina-shaped element 110, the air pump 134 may be activated and deactivated by operating at least one button. The at least one button may include a first button 150 and a second button 152 (as shown in FIGS. 1 and 2). Specifically, the first button 150 may be operated for activating the adult toy 100 and the second button 152 may be operated for deactivating the adult toy 100. Additionally, the at least one button may be configured to regulate the air pressure inside the chamber 132. The adult toy 100 may include one or more stimulation devices arranged inside the substantially hollow cylindrical body 102. The one or more simulation devices are configured to induce stimulations to walls of the vagina-shaped element 110 to stimulate the male genital organ received inside thereof. Some non-limiting examples of the one or more simulation devices are gel, a metal foil, electrically and thermally conductive materials, and a vibrating device. The air pump 134 is disposed in fluid communication with the ambient atmosphere and the chamber 132. The air pump 134 draws air from the ambient atmosphere via the third air-hole 120, pressurizes the drawn air and passes the pressurized air via the air outtake pipe 146 (and the extended air outtake pipe 148) to provide air pressure inside the chamber 132. The chamber 132 is adapted to inflate and deflate based on the air pressure inside thereof. The inflation and deflation of the chamber 132 cause the flexible bag 126 and thereby the vagina-shaped element 110 to, respectively, compress and de-compress in order to stimulate the male genital organ (penis) received inside thereof. That is, when the chamber 132 inflates, the flexible bag 126 is compressed and in turn squeezes the vagina-shaped element 110 to apply pressure on the penis, which is inserted into the vagina-shaped element 110, which in turn would give stimulation to users to enhance user experience. It may be appreciated that since the flexible bag 126 is cylindrical shaped, surrounding the vagina-shaped element 110, so the pressure stimulation applied on the penis is 360 degrees (i.e. consistent all around) which closely simulates real-life sexual intercourse, and thus provides more satisfaction to the user, as compared to other sex toys as known in the art.

It may be understood that as the air pump 134 pumps more air into the chamber 132, more pressure stimulation will be given to the penis received inside the vagina-shaped element 110. However, it may also be understood that too much pressure stimulation would make user uncomfortable or even hurt user's body. In the adult toy 100 of the present disclosure, both the chamber 132 and the flexible bag 126 can be vented through the respective air-holes, in order to reduce the pressure stimulation. Herein, the chamber 132 can reduce the pressure stimulation by venting air from the first air-hole 116 (via the first valve 136), and the flexible bag 126 can reduce the pressure stimulation by the second air-hole 118 (via the second valve 142). It may be appreciated that the valves 136 and 142 can be operated manually or automatically (e.g., by means of electrical switches and controller, as discussed later in some detail) without any limitations.

Specifically, in the present examples, the first valve 136 can be operated to vent out air pressure from the chamber 132 by pushing the first outlet pipe 138. On the other hand, the second valve 142 can be operated to vent out air pressure from the flexible bag 126 by rotating the rotating shutter thereof. For example, the first valve 136 can be opened by pressing or pushing down the first outlet pipe 138 causing the air pressure in the chamber 132 to be exhausted to reduce air pressure, and reduce stress stimulation applied to the penis inserted into the vagina-shaped element 110. Further, for example, the second valve 142 can be rotated to state of covering or uncovering the second air-hole 118 to vent out air pressure from the flexible bag 126. When the second air-hole 118 is covered by the second valve 142 completely, air in the flexible bag 126 can't be exhausted; and in this situation, the penis inserted into the vagina-shaped element 110 would get more stress stimulation. When the second air-hole 118 is uncovered by the second valve 142, air pressure in the flexible bag 126 can be exhausted; and in this situation, the penis inserted into the vagina-shaped element 110 would not get more stress stimulation. Also, the second air-hole 118 can be covered partially, then air pressure in the flexible bag 126 can be partly exhausted; and in this situation, more the second air-hole 118 is covered, the more stress stimulation will be applied to the penis inserted into the vagina-shaped element 110.

In some embodiments, the adult toy 100 may include a pressure sensor (not shown) configured to measure air pressure inside the chamber 132. Further, the adult toy 100 may include a controller 154 disposed in signal communication with the pressure sensor to receive the measured air pressure information therefrom. The controller 154 is configured to regulate the air pump 134 to maintain the air pressure inside the chamber 132 within a predetermined range based, at least in part, on the measured air pressure information. It may be understood that the controller 154 may control the opening and closing of the first valve 136 in order to regulate the air pressure inside the chamber 132. The controller 154 can keep pressure in the chamber 132 in a reasonable range which would comfort the user. If the pressure as controlled by the controller 154 may not be desirable and/or comfortable, the user can manually regulate the valves 136 and 142 to release the air pressure. Such arrangement for automatic as well as manual control may be contemplated by a person skilled in the art and thus has not been explained herein for the brevity of the present disclosure.

In one or more embodiments, the adult toy 100 can be operated in a portable and a stand-alone manner. For this purpose, the adult toy 100 includes a battery (not shown) arranged inside the cylindrical body 102 to power the air pump 134. Such battery may generally be placed inside the compartment 122, in close proximity to the air pump 134 for providing suitable electrical connections. Further, the adult toy 100 may include a charging port 156 (as shown in FIG. 3) provided on the cover plate 114 to plug an electric line for receiving electric power for charging the battery. In alternate example, the adult toy 100 may be plugged in directly to an electrical wall socket or any other power source for powering the operation of the air pump 134 or any other powered component inside thereof.

Men can have sexual dysfunctions or changes in sexual response based on age, illness, medication or other factors that can make it difficult to perform sexually. For example, men have erectile dysfunction problems which render them unable to perform sexually. The problems can be physical, emotional, or psychological, or a combination of such factors. Some solutions include drugs or other chemical or hormonal aid. However, the side effects of drugs are seldom completely understood, and may over the long term exacerbate the problem or lead to other problems. Other solutions include surgery to the sexual organs. Surgery is often inaccurate, risky, painful, and/or expensive, and may not address the real problem.

The adult toy 100 of the present disclosure enables a person to experience the stimulation and sensations of a sexual event, while avoiding invasive and/or detrimental effects or drugs or surgery associated with other methods of addressing sexual dysfunction. The adult toy 100 can come in a variety of configurations and perform a variety of functions, ranging from medical therapy to erotic stimulation. The adult toy 100 can provide different types of stimulations, such as vibrational stimulation, motion stimulation, force stimulation, electric stimulation, friction stimulation, and/or other types of stimulation to a user. In some examples, the adult toy 100 can provide a sensory feedback to a user to indicate the real time strength, pattern, and other status information of the stimulations. The sensory feedback can be audio feedback and/or haptic feedback to the user.

The adult toy 100 of the present disclosure comes under the category of artificial vaginas, which exist in many styles. In particular, the adult toy 100 consists in a shape or form fitted with the vagina-shaped element 110 with the opening 112 where the penis is introduced and that has a design that stimulates and simulates different sexual techniques. The adult toy 100 of the present disclosure accurately simulates sexual intercourse. The adult toy 100 is self-powered and functions in a hands-off manner. The adult toy 100 can be implemented to satisfy male sexual urge, but also has general therapeutic use. The pneumatic design of the adult toy 100 allows action to occur even while the penis is flaccid. Therefore, men suffering from impotence, either circulatory or physiological in origin, will benefit from the adult toy 100 of the present disclosure. The adult toy 100 of the present disclosure can be implemented in urology clinics, fertility clinics, and sperm banks will also employ the present invention.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An adult toy, comprising:

a substantially hollow cylindrical body having a first end and a second end;

a vagina-shaped element arranged inside the substantially hollow cylindrical body, the vagina-shaped element providing an opening at the first end of the substantially hollow cylindrical body to receive a male genital organ therein;

a flexible bag arranged between the substantially hollow cylindrical body and the vagina-shaped element, the flexible bag being configured with a space defining a chamber surrounding the vagina-shaped element; and an air pump arranged towards the second end of the substantially hollow cylindrical body, the air pump being disposed in fluid communication with an ambient atmosphere and the chamber and being configured to provide an air pressure inside the chamber, wherein the chamber is adapted to inflate and deflate based on the air pressure therein to cause the vagina-shaped element to compress and decompress to stimulate the male genital organ received therein.

2. The adult toy as claimed in claim 1, wherein the opening of the vagina-shaped element includes at least one of a mesh, a gauze, and a sponge and is of a labyrinth form.

3. The adult toy as claimed in claim 1, further comprising:

a cover plate arranged at the second end of the substantially hollow cylindrical body, the cover plate being provided with:

a first air-hole adapted to be disposed in fluid communication with the chamber, to vent out pressurized air therefrom, and a third air-hole adapted to be disposed in fluid communication with the air pump, to allow the air pump to draw air from the ambient atmosphere.

4. The adult toy as claimed in claim 3, further comprising:

a first valve provided on the chamber such that the first valve is disposed in an open position to allow for venting out pressurized air from the chamber when pushed; and a first outlet pipe aligned with the first valve and arranged with respect to the first air-hole to translate therein, wherein the first outlet pipe is adapted to be pushed to move through the first air-hole so as to push the first valve.

5. The adult toy as claimed in claim 4, further comprising a controller configured to control opening and closing of the first valve for regulating the air pressure inside the chamber.

6. The adult toy as claimed in claim 1, wherein the vagina-shaped element extends partially along a length of the substantially hollow cylindrical body between the first end and the second end.

7. The adult toy as claimed in claim 1, further comprising one or more stimulation devices arranged inside the substantially hollow cylindrical body and configured to induce stimulations to walls of the vagina-shaped element to stimulate the male genital organ received therein.

8. The adult toy as claimed in claim 7, wherein the one or more stimulation devices comprises at least one of a gel, a metal foil, other electrically and thermally conductive materials, or a vibrating device.

9. The adult toy as claimed in claim 8, wherein the vagina-shaped element has channels built in to its structure to use the at least one of the gel or the metal foil or the other electrically or thermally conductive materials or the vibrating device to induce stimuli to specific regions on a surface of the male genital organ received therein.

10. The adult toy as claimed in claim 1, further comprising at least one button for activating the adult toy and regulating the air pressure inside the chamber.

11. The adult toy as claimed in claim 1, wherein the adult toy is configured to provide a sensory feedback to a user to indicate real-time strength, pattern, and other status information of stimulations of the adult toy.

12. An adult toy, comprising:

a substantially hollow cylindrical body having a first end and a second end;

a vagina-shaped element arranged inside the substantially hollow cylindrical body, the vagina-shaped element providing an opening at the first end of the substantially hollow cylindrical body to receive a male genital organ therein;

a chamber arranged between the substantially hollow cylindrical body and the vagina-shaped element, the chamber surrounding the vagina-shaped element; and an air pump arranged towards the second end of the substantially hollow cylindrical body, the air pump being disposed in fluid communication with an ambient atmosphere and the chamber and being configured to provide an air pressure inside the chamber, wherein:

the chamber is adapted to inflate and deflate based on the air pressure therein to cause the vagina-shaped element to compress and decompress to stimulate the male genital organ received therein, and the adult toy is configured to provide a sensory feedback to a user to indicate real-time strength, pattern, and other status information of stimulations of the adult toy.

* * * * *